UNITED STATES PATENT OFFICE 2,258,188

VINYLIDENE CHLORIDE COMPOSITION STABLE TO LIGHT AND HEAT

Lorne A. Matheson, Raymond F. Boyer, and Stephen C. Stowe, Midland, Mich., assignors to The Dow Chemical Company, Midland, Mich., a corporation of Michigan No Drawing. Application September 19, 1940,
Serial No. 357,406

4 Claims. (Cl. 260—80)

The present invention relates to compositions comprising polymeric vinylidene chloride products and certain light and heat stabilizers therefor.

The polymers of vinylidene chloride alone, its co-polymers with other polymerizable materials, various plasticized compositions thereof, and certain ways in which they may be made, are described in U. S. Patents Nos. 2,160,903–4 and 2,160,931–948. The polymers of vinylidene chloride alone and its co-polymers and plasticized compositions are herein referred to as "polymeric vinylidene chloride products." These products, or most of them, are capable of being molded to form useful articles under the combined effects of heat and pressure. Some of them exhibit sufficient solubility in certain solvents, more particularly at elevated temperatures, to permit their being cast as films. In most cases, the articles produced either by molding, extrusion, or by casting from solution of polymeric vinylidene chloride products are subject to decomposition when exposed for prolonged periods to the effects of light. This appears to be particularly true of articles having thin cross section, especially when they are subjected to the effects of ultraviolet light. This apparent shortcoming of articles produced from polymeric vinylidene chloride products makes it highly desirable to obtain stabilizers for these products which will prevent or at least minimize the darkening effect heretofore observed when the products have been exposed to light. Many of the polymeric vinylidene chloride products exhibit evidence of at least partial decomposition when subjected to temperatures substantially above the softening point for brief periods or even when subjected to somewhat lower temperatures for prolonged periods. Hence, in addition to the desirablity of providing light stabilizers, it is also desired to provide materials which will stabilize these polymer products against the decompositional effect of heat.

It is accordingly among the objects of the present invention to provide a polymeric vinylidene chloride product stabilized against the darkening and embrittling effects of light. Another object is to provide a composition comprising a polymeric vinylidene chloride product and a light stabilizer therefor. A further object is to provide a composition of a polymeric vinylidene chloride product and a heat stabilizer therefor. Particular objects will appear hereinafter.

It has now been found that the foregoing and related objects may be attained through the incorporation in a polymeric vinylidene chloride product of an unsaturated disulfide having the formula

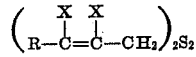

wherein R is hydrogen, methyl or ethyl, and each X independently is a member of the group hydrogen, methyl, ethyl, and halogen. For simplicity of reference, such compounds will be referred to herein as "allyl-type disulfides." The allyl-type dissulfides may be incorporated in the polymeric vinylidene chloride product in amounts which generally vary in the range from about 1 to about 10 per cent based on the weight of the said polymer product.

The allyl-type disulfides may be added to the polymeric product in various ways. For example, if the polymer or co-polymer is capable of being dispersed or dissolved in an organic solvent, the stabilizer may be added to the said solution and the stabilized polymeric product obtained from the solution in the desired form. Alternatively, the polymeric product may be masticated with the stabilizer on compounding rolls in the methods well known to the art.

Regardless of the manner in which the herein concerned stabilizers are added to the polymeric products, it has been found that they exhibit a remarkable stabilizing effect on the polymeric material when the latter is exposed to light. Thus, an untreated film or filament of a vinylidene chloride product may assume a dark brown or black coloration after exposure to sunlight. By way of contrast, the composition containing relatively small amounts of an allyl-type disulfide, when exposed to sunlight in like manner and in the same physical state, will remain much lighter colored than the blank for periods up to several months or longer. Similarly, when the allyl-type disulfide is present in the composition, the latter is able to withstand temperatures which materially darken the blank without any substantial discoloration of the stabilized composition.

The following example illustrates the practice of the present invention:

A 20 per cent solution in dioxane of the co-polymer of vinylidene chloride with about 10 per cent of ethyl acrylate was treated with 1, 3, and 10 per cent, based on the weight of the co-polymer present, of allyl-disulfide, 2-methylallyl disulfide, 2-methylallyl tetra-sulfide, allyl-tri-sulfide, 3 - chloroallyl - disulfide, 2-chloroallyl-disulfide and other related products of similar structure. From the so-formed solutions of co-polymer and intended stabilizing agents, films 0.003 inch thick were cast on clear glass plates and were then exposed in the fadeometer for 48 hours. An observation was made of the per cent of the available visible light which was transmitted through the samples, both before and after exposure. It was found that none of the trisulfides or tetrasulfides were as stable as the untreated polymer, whereas the disulfides having the general formula given above all exhibited considerable improvement in the light stability of the polymer product. Particularly effective materials are allyl-disulfide and 2-methylallyl-disulfide, both of which showed considerable improvement, not only over the untreated blank, but also over the samples containing others of the allyl-type disulfides. In addition to the light stabilizing effect of the allyl-type disulfides, these compounds also have been found to exhibit an appreciable amount of stabilizing action against the effects of heat when incorporated in polymeric vinylidene chloride products. They are stabilizers of dual function, effective both against light and heat.

The invention has been illustrated with particular reference to the co-polymer of vinylidene chloride and ethyl acrylate. It is to be understood that the invention is not limited to its use in connection with this co-polymer but that it may be applied equally as effectively to other co-polymers of vinylidene chloride such as those with vinyl chloride, vinyl acetate, styrene, methyl methacrylate, and the like. In its practical application, the invention appears to be limited only by the requirement that the polymeric vinylidene chloride product to be treated is one which, without a light stabilizing agent, shows evidence of decomposition when exposed to light.

Other modes of applying the principle of our invention may be employed instead of the one explained, change being made as regards the materials employed, provided the ingredients stated by any of the following claims or the equivalent of such stated ingredients be employed.

We therefore particularly point out and distinctly claim as our invention:

1. A composition of matter comprising a polymeric vinylidene chloride product and, as a stabilizing agent therefor, an allyl-type disulfide having the general formula

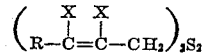

wherein R is a member of the class consisting of hydrogen, the methyl and ethyl radicals, and each X individually is selected from the class consisting of hydrogen, methyl, ethyl, and halogen.

2. A composition of matter comprising a polymeric vinylidene chloride product and, as a stabilizing agent therefor, from about 1 to 10 per cent, based on the weight of the polymer, of an allyl-type disulfide having the general formula

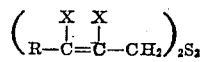

wherein R is a member of the class consisting of hydrogen, the methyl and ethyl radicals, and each X individually is selected from the class consisting of hydrogen, methyl, ethyl, and halogen.

3. A composition of matter comprising a polymeric vinylidene chloride product and, as a stabilizing agent therefor, allyl-disulfide.

4. A composition of matter comprising a polymeric vinylidene chloride product and, as a stabilizing agent therefor, 2-methylallyl-disulfide.

LORNE A. MATHESON.
RAYMOND F. BOYER.
STEPHEN C. STOWE.